3,139,410
MANUFACTURE OF POLYURETHANE FOAMS

James H. Wild, John Francis Wood, and George Woods, Manchester, England, assignors to Imperial Chemical Industries Limited, London, England, a corporation of Great Britain
No Drawing. Filed May 17, 1961, Ser. No. 110,662
Claims priority, application Great Britain May 20, 1960
5 Claims. (Cl. 260—2.5)

This invention relates to improvements in or relating to the manufacture of polymeric materials, more particularly to the manufacture of foamed polyurethane materials.

It is already known to prepare foamed polyurethane materials by reacting polyethers and polyisocyanates in the presence of gas-forming materials such as water and chemically inert volatile liquids, for example fluoroalkanes. It is also known to control or modify the pore structure of the foamed products by carrying out the foam-forming reaction in the presence of silicone oils or polysiloxanes of relatively high molecular weights, for example of up to 20,000. The incorporation of such polysiloxanes, which have a viscosity of at least 10 centistokes at 25° C. facilitates the production of foams with a uniform fine pore structure. However certain disadvantages are associated with the use of this particular type of polysiloxane. Thus for example when such polysiloxanes are used in the preparation of foams from pre-formed polyether-polyisocyanate reaction products or prepolymers, in particular by reaction with water, the foamed products frequently shrink owing to the presence of an excessively high proportion of closed cells. This tendency to shrink is especially marked in foams of considerable thickness, for example over 12 inches thick: such foams are difficult to treat by the crushing procedure usually required to break closed cells. Another common method for the preparation of foams comprises the reaction of polyethers and polyisocyanates in the presence of gas-forming materials such as water: the use of the relatively high molecular weight polysiloxanes in this method of preparation or in the alternative prepolymer method already referred to, is frequently ineffective since these polysiloxanes do not always stabilise the foaming mixtures sufficiently to prevent the loss of appreciable quantities of gas and the consequent formation of comparatively high density products.

It has now been found that, surprisingly, the above disadvantages are obviated or minimised by the use of certain simple low molecular weight silicone oils. Furthermore it has been found that these silicone oils are effective at a lower concentration than the higher molecular weight silicone oils used hitherto.

Thus according to the present invention there is provided an improved process for the manufacture of foamed polyurethane materials by the reaction of hydroxyl group-containing polyethers and organic polyisocyanates, characterised in that the reaction is carried out in the presence of a polydialkylsiloxane having a viscosity of from 2 to 9 centistokes at 25° C.

Examples of suitable polydialkylsiloxanes include those polydialkylsiloxanes in which the alkyl groups are selected from the group comprising methyl, ethyl, propyl and butyl. It is preferred to use polydimethylsiloxanes.

Particularly advantageous results are obtained using polydialkylsiloxanes having a viscosity of from 4 to 6 centistokes at 25° C.

The polysiloxanes used in the process of the present invention are normally incorporated in a proportion of from 0.001% to 2% by weight of the weight of polyether and preferably in a proportion of from 0.002% to 1% by weight of the weight of polyether. The present polydialkylsiloxanes may be prepared by the general methods described in the prior art relating to the preparation of such materials, for example by the hydrolysis and condensation of alkyl chlorsilanes.

Examples of suitable polyethers for use in the process of the present invention include those polyethers disclosed as suitable for the preparation of polyurethane foams in the prior art, such as hydroxyl-ended polymers and copolymers of cyclic oxides such as 1:2-alkylene oxides for example ethylene oxide, epichlorhydrin, 1:2-propylene oxide, and 1:2- and 2:3-butylene oxides, oxacyclobutanes and tetrahydrofuran. Thus suitable polyethers may be prepared by polymerising by the general methods described in the prior art one or more cyclic oxides in the presence of a difunctional compound containing two reactive hydrogen atoms per molecule, such as water, a glycol or a primary monoamine, or in the presence of a polyfunctional compound containing more than two reactive hydrogen atoms per molecule, such as ammonia, a monoalkanolamine, a polyamine or a polyhydroxy compound, for example a trihydric alcohol such as glycerol, a sugar such as sorbitol, or a phenol/formaldehyde reaction product. By this means there may be obtained linear or branched polyethers of for example molecular weights of up to 10,000, containing two or more hydroxyl groups per molecule. However the process of the present invention is particularly advantageous when applied to hydroxyl-ended polyethers of molecular weights from 1000 to 8000, preferably from 1500 to 6000.

Especially valuable are the polyethers obtained by polymerisation of 1:2-propylene oxide, 1:2- and 2:3-butylene oxide or mixtures of these oxides with each other and/or with minor proportions of other alkylene oxides such as ethylene oxide.

Suitable organic polyisocyanates for use in the process of the present invention include polyisocyanates described in the prior art as suitable for use in the preparation of polyurethane foams.

Examples of suitable organic polyisocyanates include aliphatic diisocyanates such as hexamethylene diisocyanate, aromatic diisocyanates such as tolylene-2:4-diisocyanate, tolylene-2:6-diisocyanate, diphenylmethane-4:4′-diisocyanate, 3-methyldiphenylmethane-4:4′-diisocyanate, m- and p-phenylene diisocyanate, chlorophenylene-2:4-diisocyanate, naphthylene-1:5-diisocyanate, diphenyl-4:4′-diisocyanate, 4:4′-diisocyanato-3:3′-dimethyldiphenyl and diphenyl ether diisocyanate and cycloaliphatic diisocyanates such as dicyclohexylmethane diisocyanate. Triisocyanates which may be used include aromatic triisocyanates such as 2:4:6-triisocyanatotoluene and 2:4:4′-triisocyanatodiphenyl ether. Examples of other suitable organic polyisocyanates comprise the reaction products of an excess of a diisocyanate with polyhydric alcohols such as trimethylolpropane, and uretedione dimers and isocyanurate polymers of diisocyanates for example of tolylene-2:4-diisocyanate. Mixtures of polyisocyanates may be used. Examples of suitable mixtures include the polyisocyanate compositions obtained by the phosgenation of the mixed polyamine reaction products of formaldehyde and one or more aromatic amines such as aniline and orthotoluidine.

The process of the present invention gives especially advantageous results when the foam formation is carried out in the presence of water. The water may be used in various amounts according to the density of foamed product required but it is normally incorporated in an amount of from 1% to 10% by weight of polyether. The water may be used as the sole gas-forming agent or may be replaced wholly or in part by a non-isocyanate-reactive volatile liquid of boiling point not greater than 75° C., and preferably from —40° C. to 50° C., for example halogenated hydrocarbons, in particular fluorinated alkanes such as monofluoro-trichloromethane, dibromodifluoromethane and 1:1:2-trichloro-1:2:2-trifluoroethane.

The process of the present invention may be carried out by the general methods more fully described in the prior art relating to the manufacture of foamed polyurethanes. Thus the polyether may first be converted to a polyether-polyisocyanate prepolymer by reaction in one or more stages with an amount of polyisocyanate in excess of the amount equivalent to the hydroxyl end-groups of the polyether. The preparation of the prepolymer may be carried out by heating the polyether and polyisocyanate together at for example 75° to 125° C., or by allowing the two materials to react without application of external heat in the presence of a catalyst for the reaction, for example a tertiary amine or a non-basic heavy metal compound such as manganese acetylacetonate. The prepolymer may then be converted to a foam by treating with the gas-forming material, if desired with the addition of more polyisocyanate. Alternatively the polyether, polyisocyanate and gas-forming material such as water may be interacted simultaneously to produce the foam in a single stage.

The foam-forming reaction is usually carried out in the presence of a catalyst for that reaction for example a basic compound such as a tertiary amine, an alkali metal hydroxide or a salt of a weak acid such as a carbonate or acetate, or a non-basic heavy metal compound such as dibutyl tin dilaurate or manganese acetyl acetonate or stannous octoate. As is also described in the prior art relating to the preparation of polyurethane foams, there may also be incorporated in the foam-forming mixture various additives such as other surfactants for example oxyethylated phenols, oxyethylated fatty alcohols such as oleyl alcohol, fatty acid salts such as diethylamine oleate, sulphuric acid derivatives of long chain compounds such as sulphated methyl oleate, and polyalkylene oxide block copolymers and polysiloxane-polyalkylene oxide block copolymers, flame-retardants such as $\beta$-trichlorethyl phosphate and antimony oxide, plasticisers such as tricresyl phosphate and dioctyl phthalate, antioxidants such as alkylphenols, colouring matters and fillers such as carbon black, mica, and silica, auxiliary gas forming agents such as lithium aluminium hydride, and cross-linking agents such as trihydric alcohols.

The polydialkylsiloxanes used in the process of this invention may be incorporated with any of the other additives mentioned above or they may be incorporated separately. Thus they may be added to the polyether or the polyisocyanate before any reaction occurs or to the polyether-polyisocyanate prepolymer, or they may be blended with a mixture of other ingredients such as water and catalyst, or with for example the flame-retardant.

The invention is illustrated but not limited by the following examples in which parts and percentages are by weight.

EXAMPLE 1

100 parts of polypropylene glycol of molecular weight 2000 are heated for 2 hours at 110° C. with 40 parts of an 80:20 mixture of the 2:4 and 2:6 isomers of tolylene diisocyanate. The mixture is cooled to 20° C. and continuously blended with the following two mixtures A and B in the respective proportions 140 to 3.3 to 1.71.

Mixture A

| | Parts |
|---|---|
| Water | 3 |
| Octylphenol/ethylene oxide reaction product | 0.3 |

Mixture B

| | |
|---|---|
| Dimethylcyclohexylamine | 1.4 |
| Octylphenol/ethylene oxide reaction product | 0.3 |
| Polydimethylsiloxane (viscosity 5 centistokes at 25° C. | 0.01 |

A resilient foam product of specific gravity 0.035 is obtained.

The procedure is repeated with the replacement of the polydimethylsilixane of viscosity 5 centistokes at 25° C. by polydimethylsiloxane of viscosity 40 centistokes at 25° C. There results a foam of uneven pore structure, especially in the region of the base and sides of the foam. Using an increased concentration of the polydimethylsiloxane of viscosity 40 centistokes at 25° C. of 0.25 part the pore structure of the resultant foam is even, but shrinkage occurs through the incidence of a high proportion of closed cells.

EXAMPLE 2

40 parts of an 80:20 mixture of tolylene-2:4- and -2:6-diisocyanates are stirred into a mixture of 100 parts of polypropylene glycol of molecular weight 2000, 3 parts of water, 0.3 part of 4-dimethylaminopyridine, 0.5 part of N-dimethylbenzylamine, 1 part of octylphenol reacted with 8 molecular proportions of ethylene oxide, 0.35 part of the sodium salt of sulphated methyl oleate and 1 part of polydimethylsiloxane of viscosity 5 centistokes at 25° C. The mixture is poured into a mould. After 30 minutes a resilient cellular product is obtained having a specific gravity of 0.033.

The procedure is repeated replacing the polydimethylsiloxane of viscosity 5 centistokes at 25° C. by polydimethylsiloxanes of viscosity 10 centistokes at 25° C. and 40 centistokes at 25° C. In each case there resulted complete collapse of the cellular structure two minutes after mixing due to release of carbon dioxide.

EXAMPLE 3

To a mixture of 50 parts of polypropylene glycol of molecular weight 2000, and 50 parts of a polypropylene triol of mol. wt. 3000, obtained by oxypropylating hexane triol, 38 parts of an 80:20 mixture of the 2:4 and 2:6 isomers of tolylene diisocyanate and 0.25 part of N:N-dimethylbenzylamine are added with stirring at room temperature. After 24 hours the reaction product is blended continuously in the proportions of 100 parts of reaction product with 1 part of N:N-dimethyl cyclohexylamine, 0.01 part of polydimethylsiloxane of viscosity 5 centistokes at 25° C., 2.14 parts of water and 0.214 part of an octylphenol/ethylene oxide reaction product. The mixture is poured continuously into a travelling mould and 15 minutes after pouring yields a highly resilient cellular product of specific gravity 0.034.

EXAMPLE 4

100 parts of polypropylene glycol of molecular weight 2000 containing 0.25 part of N:N-dimethylbenzylamine are mixed with 57 parts of an 80:20 mixture of the 2:4 and 2:6 isomers of tolylene diisocyanate and the mixture allowed to stand at room temperature for 24 hours. 100 parts of the resulting reaction product are blended with 0.35 part of N:N-dimethylcyclohexylamine, 0.25 part of polydimethylsiloxane of viscosity 5 centistokes at 25° C., 3.1 parts of water and 1.0 part of an octylphenol/ethylene oxide reaction product and the mixture poured into a mould. After 30 minutes a resilient cellular product of specific gravity 0.021 is obtained.

The procedure is repeated replacing the polydimethylsiloxane of viscosity 5 centistokes at 25° C. with polydimethylsilanes of viscosities 10 centistokes, 20 centistokes or 40 centistokes at 25° C. In all these cases there results an almost complete loss of the carbon dioxide and the resultant products are high density polymers containing large bubbles.

EXAMPLE 5

100 parts of polyoxypropylene glycol of molecular weight 2000 are blended with 38 parts of an 80:20 mixture of the 2:4 and 2:6 isomers of tolylene diisocyanate and 5.7 parts of a mixture comprising 3 parts of water, 0.3 part of 4-dimethylamino pyridine, 0.5 part of N-dimethylbenzylamine, 1 part of an octylphenol/ethylene oxide condensate, 0.5 part of the sodium salt of sulphated methyl oleate and 0.4 part of a polydimethylsiloxane fluid having a viscosity of 5 centipoises at 20° C. The blend is poured into a mould and after 1 hour a resilient cellular product having a density of 0.032 g./cc. is obtained.

If the polydimethyl siloxane fluid is omitted the mixture fails to form a resilient cellular product of low density.

EXAMPLE 6

200 parts of a condensation product of glycerol and propylene oxide having an approximate molecular weight of 3000 and a hydroxyl value of 56 mg. KOH/gm., was stirred for 10 seconds with 5.8 parts of water, 0.4 part of a polydimethylsiloxane of viscosity 5 centistokes at 25° C., and 2 parts of stannous octoate. To this mixture there was added, with rapid stirring, 76 parts of the 80:20 mixture of tolylene 2:4- and tolylene-2:6-diisocyanates. At the commencement of foaming the mixture was poured into a mould when a flexible foam having a fine internal structure was rapidly obtained. The product had a density of 0.027 g./cm.$^3$.

What we claim is:

1. In an improved process for the manufacture of foamed polymeric material which comprises the mixing and simultaneous interacting of a hydroxyl group-containing polyether, an organic polyisocyanate and water; the improvement comprising carrying out said process in the presence of a polydialkylsiloxane having a viscosity of from 2 to 9 centistokes at 25° C., a tertiary amine catalyst and a second surfactant selected from the group consisting of oxyethylated phenols, oxyethylated oleyl alcohol, diethylamine oleate and sulfated methyl oleate.

2. An improved process for the manufacture of foamed polymeric material as claimed in claim 1 wherein the polydialkylsiloxane is a polydimethylsiloxane.

3. An improved process for the manufacture of foamed polymeric materials as claimed in claim 1 wherein the polydialkylsiloxane has a viscosity of from 4 to 6 centistokes at 25° C.

4. An improved process for the manufacture of foamed polyurethane materials as claimed in claim 1 wherein the polydialkylsiloxane is incorporated in an amount of from 0.001% to 2% by weight of the weight of polyether.

5. An improved process for the manufacture of foamed polymeric material as claimed in claim 1 wherein the foam formation is carried out in the presence of a non-isocyanate-reactive volatile liquid of boiling point not greater than 75° C.

References Cited in the file of this patent

UNITED STATES PATENTS

| 2,901,445 | Harris | Aug. 25, 1959 |
| 2,948,691 | Windemuth et al. | Aug. 9, 1960 |
| 2,962,183 | Rill et al. | Nov. 29, 1960 |
| 3,094,494 | Hopkins et al. | June 18, 1963 |

FOREIGN PATENTS

| 821,342 | Great Britain | Oct. 7, 1959 |